(12) United States Patent
Yi

(10) Patent No.: US 7,066,139 B2
(45) Date of Patent: Jun. 27, 2006

(54) INTAKE PORT OF LEAN BURN ENGINE AND CORE THEREOF

(75) Inventor: Jea-Woong Yi, Gwangju (KR)

(73) Assignee: Hyundai Motor Company, Seoul (KR)

( * ) Notice: Subject to any disclaimer, the term of this patent is extended or adjusted under 35 U.S.C. 154(b) by 54 days.

(21) Appl. No.: 10/884,585

(22) Filed: Jul. 2, 2004

(65) Prior Publication Data

US 2005/0115540 A1    Jun. 2, 2005

(30) Foreign Application Priority Data

Jul. 10, 2003    (KR) ...................... 10-2003-0046677

(51) Int. Cl.
*F02B 31/08*    (2006.01)

(52) U.S. Cl. ...................... 123/308; 123/432; 123/470

(58) Field of Classification Search ................ 123/308, 123/432, 470, 295
See application file for complete search history.

(56) References Cited

U.S. PATENT DOCUMENTS

| 4,246,874 | A | * | 1/1981 | Nakagawa et al. | .......... 123/308 |
| 5,146,897 | A | * | 9/1992 | Hattori et al. | .............. 123/470 |
| 5,167,211 | A | * | 12/1992 | Fukuma et al. | ............. 123/308 |
| 5,379,743 | A | * | 1/1995 | Stokes et al. | ............... 123/308 |
| 5,463,995 | A | * | 11/1995 | Sakai et al. | .................. 123/432 |
| 5,575,263 | A | * | 11/1996 | Pontoppidan et al. | ....... 123/470 |
| 5,765,531 | A | * | 6/1998 | Yoshikawa et al. | ......... 123/432 |
| 6,467,454 | B1 | * | 10/2002 | Fledersbacher et al. | ..... 123/308 |
| 6,609,499 | B1 | * | 8/2003 | Kabat et al. | ................ 123/432 |
| 6,863,046 | B1 | * | 3/2005 | Laimbock | .................... 123/308 |

FOREIGN PATENT DOCUMENTS

JP        2004-017056        1/2004

* cited by examiner

*Primary Examiner*—Erick Solis
(74) *Attorney, Agent, or Firm*—Morgan Lewis & Bockius LLP

(57) ABSTRACT

A linear port and a swirl port constitute an intake port of a lean burn engine by using an integrated core. An injector is placed at a desired location of the linear port and the swirl port, thereby facilitating the manufacture of the cylinder head, reducing manufacturing cost, improving fuel economy of the engine, and reducing toxic exhaust gas.

4 Claims, 6 Drawing Sheets

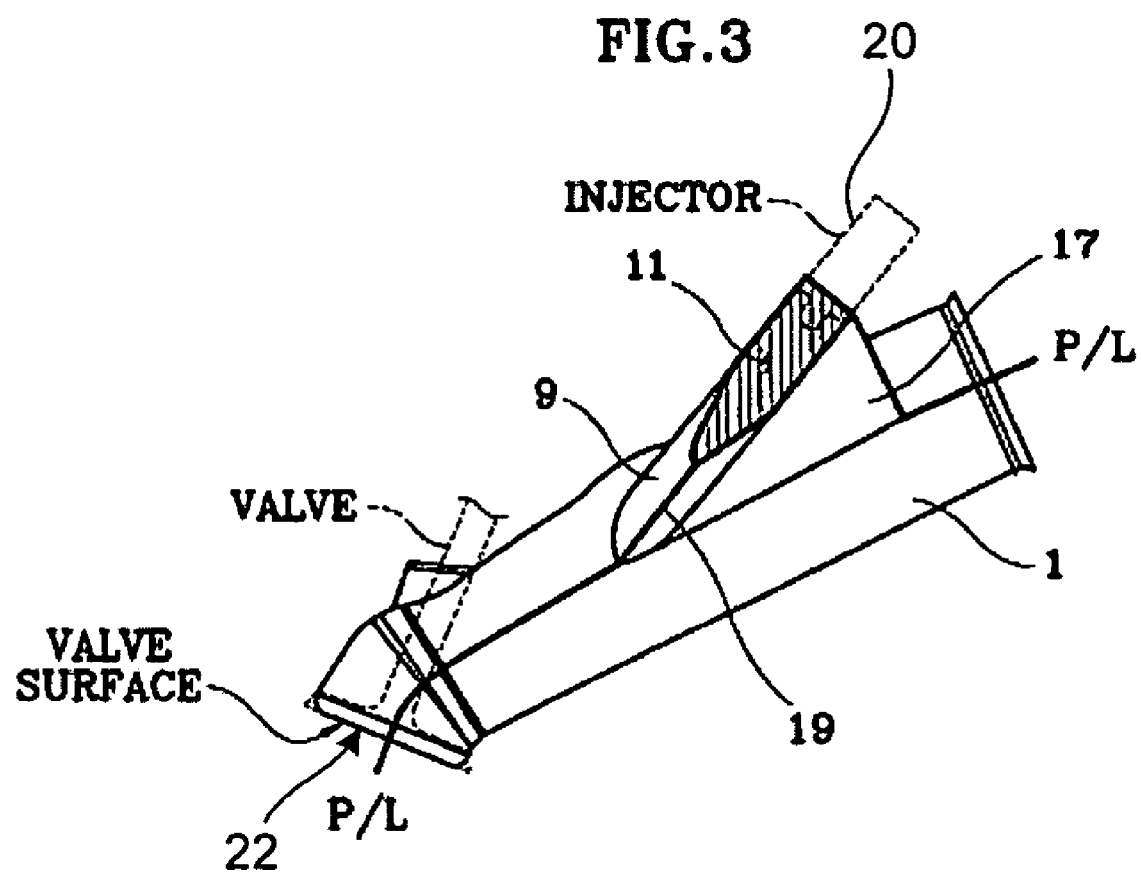

*# INTAKE PORT OF LEAN BURN ENGINE AND CORE THEREOF

CROSS-REFERENCE TO RELATED APPLICATIONS

The present application is based on, and claims priority from, Korean Application Serial Number 10-2003-0046677, filed on Jul. 10, 2003, the disclosure of which is hereby incorporated by reference herein in its entirety.

FIELD OF THE INVENTION

The present invention relates to an engine intake port. More particularly, the present invention relates to an intake port of a lean burn engine.

BACKGROUND OF THE INVENTION

Generally, a lean burn engine is designed to produce the same power output as a conventional engine while consuming less fuel than the conventional engine. This is accomplished by forming a strong swirl of the intake air in the combustion chamber and injecting fuel therein for combustion.

Accordingly, an intake port that forms the strong swirl of air is required. The intake port typically constitutes a linear port and a swirl port. The linear port has a straight line-shape configuration and the swirl port has a curved-shape configuration to change the flow direction of the intake air. The linear port and swirl port are manufactured by individual cores and are used in the mold of the cylinder head of the engine.

An injector is typically placed in the intake manifold. However, a drawback of placing the injector in the manifold is that fuel economy is not maximized and toxic exhaust gas production is not minimized. Therefore, it would be advantageous to place the injector a predetermined distance from a valve surface to achieve better fuel economy and reduce toxic exhaust gas.

SUMMARY OF THE INVENTION

According to an embodiment of the present invention a linear port and swirl port are manufactured by using an integrated core. An injector is placed at a predetermined location of the linear port and swirl port in order to achieve desired fuel economy and reduce toxic exhaust gas.

An intake port of a lean burn engine comprises a connecting part formed at a predetermined location of a linear port and swirl port along a longitudinal direction. The intake port provides fuel injected from an injector. The linear port and swirl port are separated from each other except at the connecting part.

An intake port core of the lean burn engine comprises a parting line forming an intake port of a lean burn engine having a connecting part comprising two cylinders branching from a circle toward a linear port and swirl port at a constant angle. The two cylinders meet at the single circle where an injector is installed to provide fuel to the linear port and swirl port. The parting line includes an outer line of an intersecting surface and a lateral ridgeline of two cylinders. The intersecting surface is formed by an intersection of the two cylinders of the connecting part.

BRIEF DESCRIPTION OF THE DRAWINGS

For a better understanding of the nature and objects of the present invention, reference should be made to the following detailed description read in conjunction with the accompanying drawings, in which:

FIG. 3 is a cross sectional view taken along line III—III of FIG. 1a having a parting line of a core for manufacturing the intake port.

DETAILED DESCRIPTION OF THE PREFERRED EMBODIMENTS

Figure 1A:
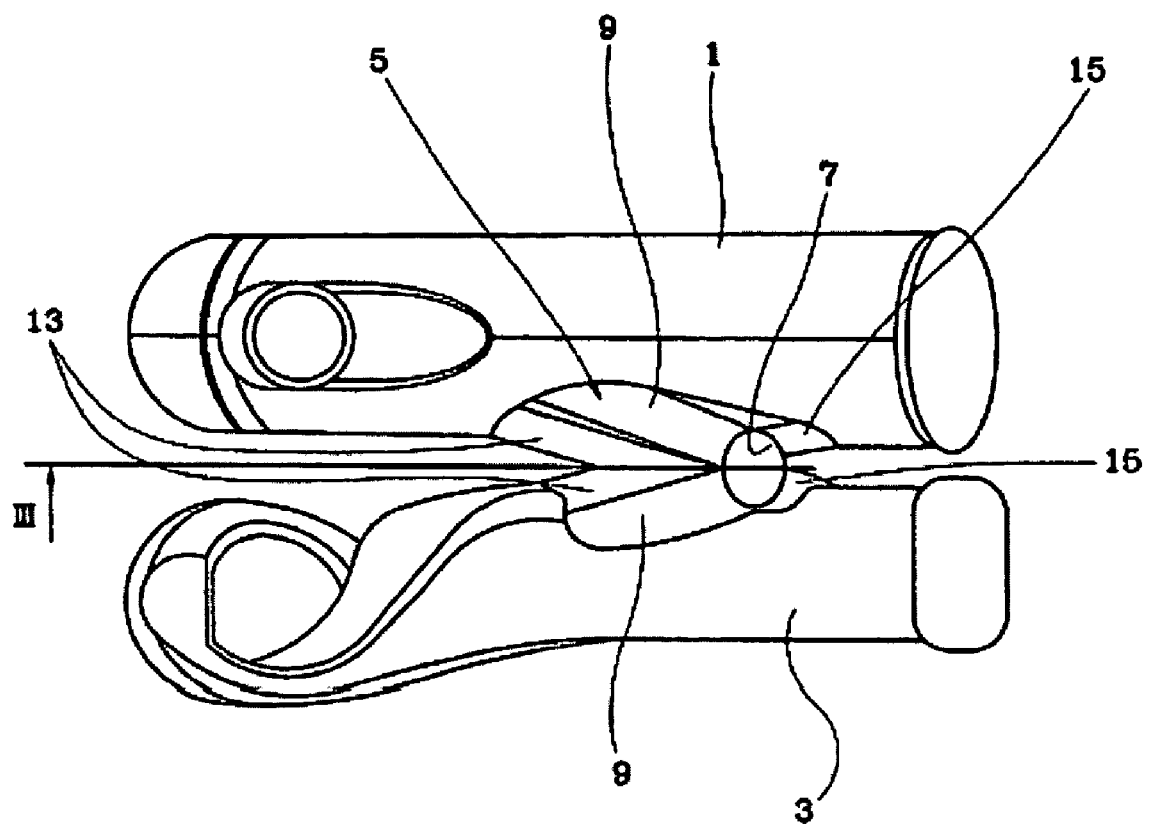
FIG. 1a is a perspective view of an intake port of a lean burn engine according to an embodiment of the present invention.
Figure 1B:
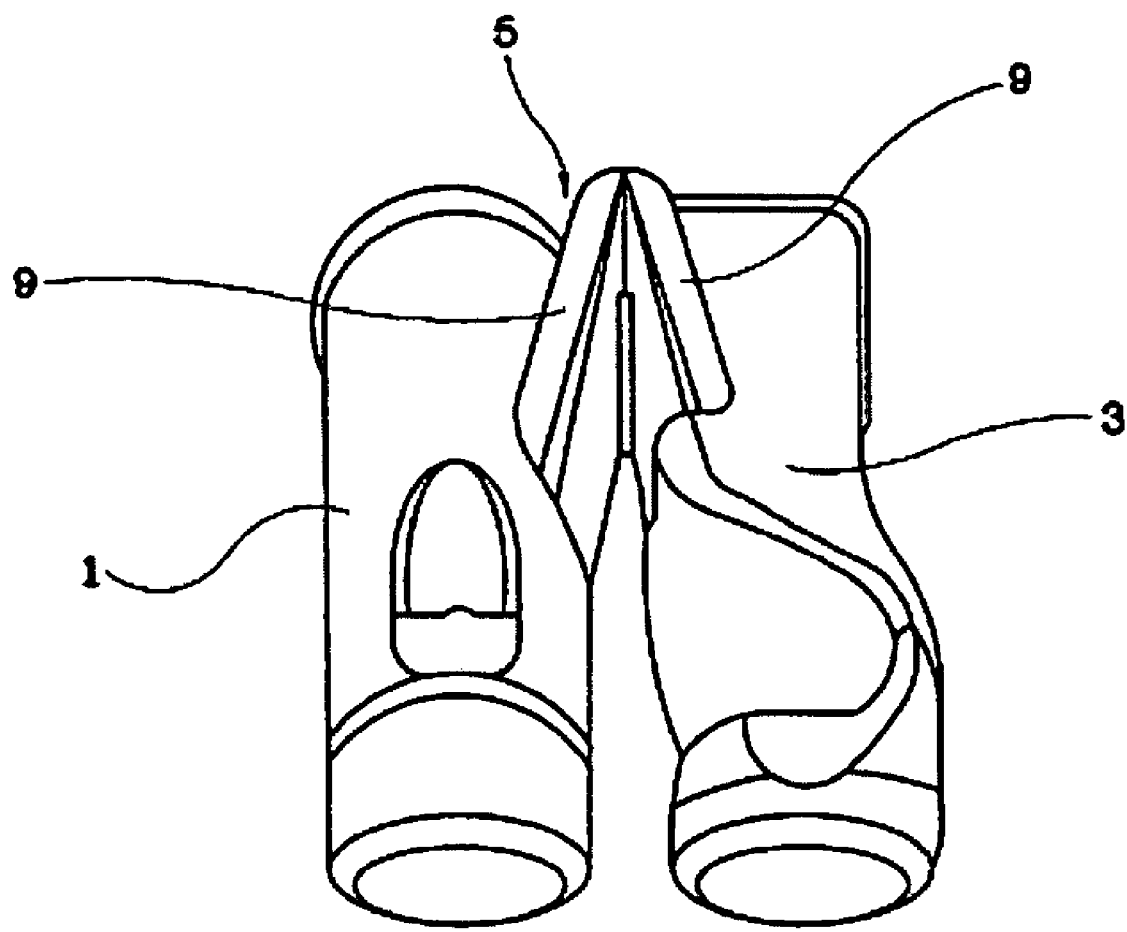
FIG. 1b is another perspective view of an intake port of a lean burn engine according to an embodiment of the present invention.
Figure 1C:
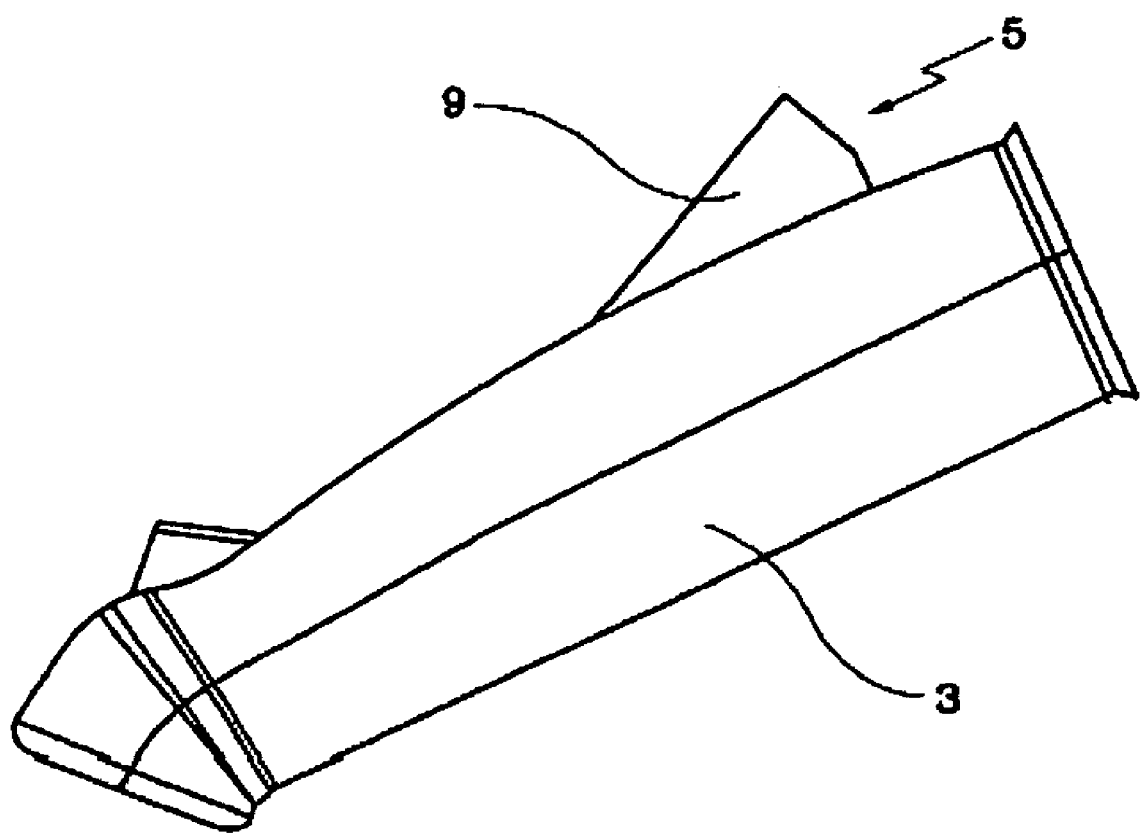
FIG. 1c is yet another perspective view of an intake port of a lean burn engine according to an embodiment of the present invention.
Figure 1D:
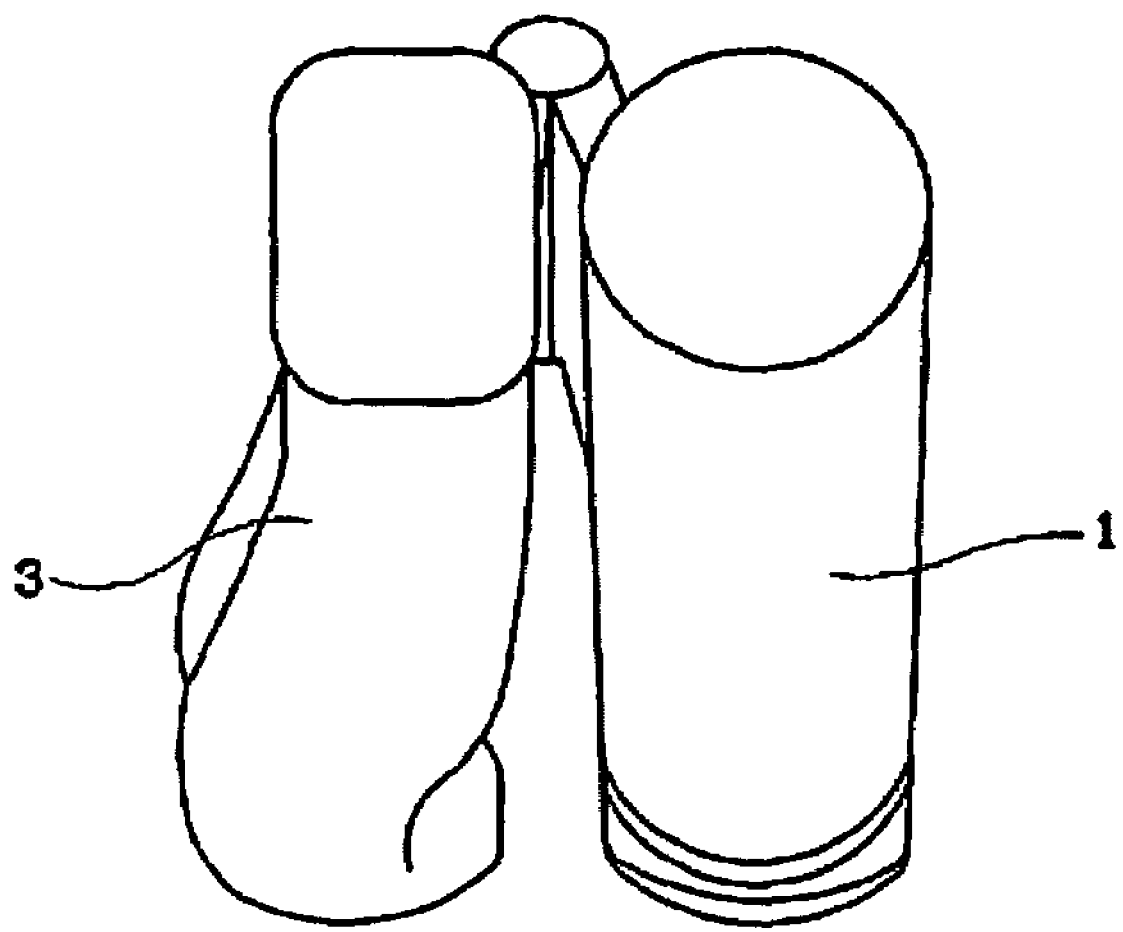
FIG. 1d is a further perspective view of an intake port of a lean burn engine according to an embodiment of the present invention.
Figure 2:
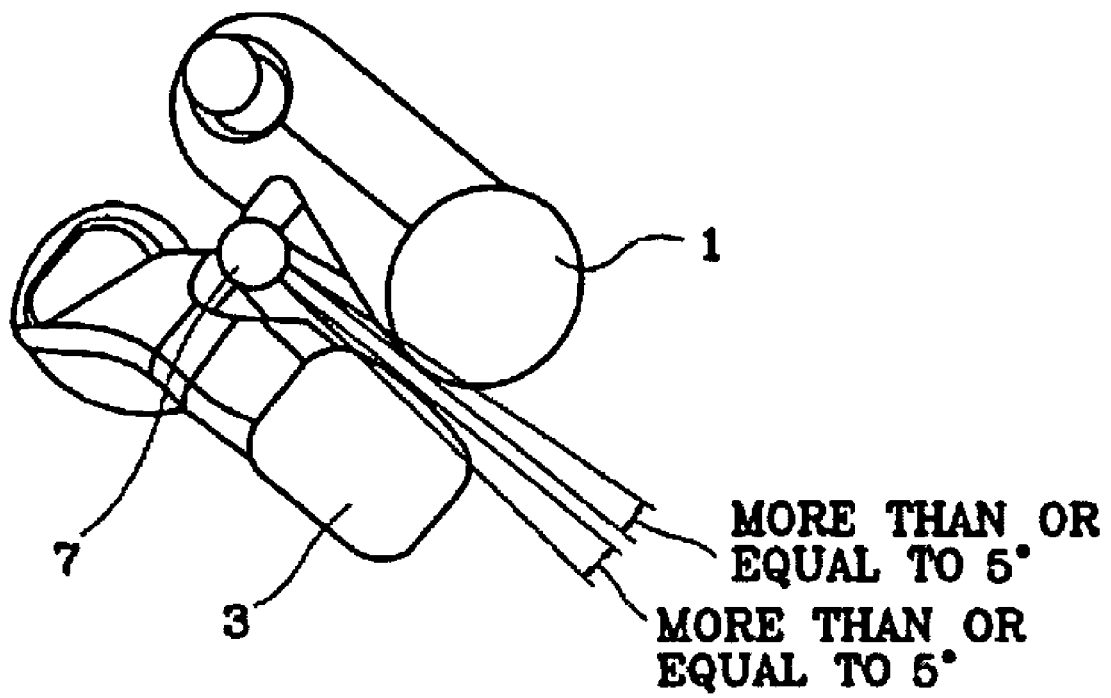
FIG. 2 is a still another perspective view of an intake port according to an embodiment of the present invention.

Referring to FIGS. 1a–3, a linear port 1 and a swirl port 3 are provided and constitute an intake port of a lean burn engine. A connecting part 5 is formed at a predetermined location on the linear port 1 and swirl port 3 along the longitudinal direction. The connecting part 5 provides fuel injected from an injector 20. The linear port 1 and swirl port 3 are separated from each other except at the connecting part 5. The connecting part 5 is preferably located about 90–120 mm away from a valve surface 22 of the engine. Installing the injector 20 at this predetermined location provides fuel economy and toxic exhaust gases at predetermined and beneficial levels.

The connecting part 5 comprises two cylinders 9 and expanded parts. The two cylinders 9 branch from a circle 7 toward the linear port 1 and swirl port 3 at a constant angle. The cylinders 9 meet at the single circle 7 where the front end of the injector 20 is installed. The expanded parts are formed around the cylinders 9.

The linear port 1 and swirl port 3 are preferably separated from each other to form an effective swirl in the lean burn driving region of the engine. Thus, in order to maintain separation between the linear port 1 and swirl port 3, the linear port 1 and swirl port 3 are configured to communicate with each other only at an intersecting surface 11 where the two cylinders 9 of the connecting part 5 intersect each other.

The expanded parts are formed to expand the sectional area of the cylinders 9 at the connection portion with the linear port 1 and swirl port 3. The cylinders 9 connect with both the linear port 1 and swirl port 3. This configuration minimizes the wall wetting phenomenon that occurs when fuel injected into the connecting part 5 condenses at the wall of the cylinder.

A first expanded part 13 is configured to expand its sectional area from the cylinder 9 toward the combustion chamber direction (i.e., toward the lower side of the cylinder 9). A second expanded part 15 is formed between an acute angle of the linear port 1 and cylinder 9 and between an acute angle of the swirl port 3 and cylinder 9 toward the intake manifold direction.

The intake port of the lean burn engine preferably forms a smooth swirl of the intake air by obtaining a sufficient separation between the linear port 1 and swirl port 3. Simultaneously, the injector 20 is installed at a proper location of the linear port 1 and swirl port 3, thereby optimizing the fuel consumption and reducing the toxic exhaust gas.

According to FIG. 3, the second expanded parts 15 formed between the acute angle of the cylinder 9 and linear port 1 and between the acute angle of the cylinder 9 and swirl port 3 include surfaces 17. The surfaces 17 face each other between the linear port 1 and swirl port 3 and are configured to be widened for more than or equal to five degrees, respectively from the central surface between the linear port 1 and swirl port 3. This configuration takes consideration into a draft of the molding to manufacture a core required to embody the intake port having the above described shape.

As illustrated in FIG. 3, the parting line (P/L) includes an outer line of the intersecting surface 11 and a lateral ridgeline 19 of two cylinders 9. The intersecting surface 11 is formed by an intersection of the two cylinders of the connecting part 5. Thus, once the P/L, draft, and core for integrating the linear port 1 and swirl port 3 are prepared, the intake port of the lean burn engine having the integrated linear port and swirl port can easily be embodied. Thereby greatly reducing the manufacturing difficulties and cost increased by a separate manufacture of the cores of the linear port and swirl port.

As apparent from the foregoing, there is an advantage in the present invention in that the linear port and swirl port are formed by an integrated core and the injector is installed at a desirable installation location of the linear port and swirl port, contributing to a facilitation of manufacturing the cylinder head, improvement of fuel economy and reduction of toxic exhaust gas.

What is claimed is:

1. An intake port of a lean burn engine, comprising:
    a connecting part formed at a predetermined location of a linear port and swirl port along a longitudinal direction for providing fuel injected from an injector, wherein said linear port and swirl port are separated from each other except at said connecting part, and wherein said connecting part comprises:
        two cylinders branching from a circle toward said linear port and said swirl port at a constant angle, wherein said cylinders meet at said single circle where said injector is installed; and
        expanded parts formed around said cylinders, wherein said expanded parts are:
            formed to expand the sectional area of said cylinders at a connection portion with said linear port and swirl port, wherein said cylinders connect with both said linear port and said swirl port; and
            formed between an acute angle of said cylinder and said linear port and between an acute angle of said cylinder and said swirl port, wherein said expanded parts include surfaces facing each other between said linear port and said swirl port, wherein said surfaces are configured to be widened for more than or equal to about five degrees, respectively from a central surface between said linear port and said swirl port.

2. The intake port as defined in claim 1, wherein said linear port and said swirl port are configured to communicate with each other only at an intersecting surface where said two cylinders of said connecting part intersect each other.

3. The intake port as defined in claim 1, wherein said connecting part is located not less than about 90 mm and not more than about 120 mm from a valve surface.

4. An intake port core of a lean burn engine, comprising:
    a parting line forming an intake port having a connecting part, said connecting part comprising:
        two cylinders branching from a circle toward a linear port and swirl port at a constant angle; and
        expanded parts formed around said cylinders, wherein said expanded parts are:
            formed to expand the sectional area of said cylinders at a connection portion with said linear port and swirl port, wherein said cylinders connect with both said linear port and said swirl port; and
            formed between an acute angle of said cylinder and said linear port and between an acute angle of said cylinder and said swirl port, wherein said expanded parts include surfaces facing each other between said linear port and said swirl port, wherein said surfaces are configured to be widened for more than or equal to about five degrees, respectively from a central surface between said linear port and said swirl port;
    wherein said two cylinders meet at said circle where an injector is installed to provide fuel to said linear port and said swirl port, wherein said parting line includes an outer line of an intersecting surface and a lateral ridgeline of two cylinders, and wherein said intersecting surface is formed by an intersection of said two cylinders of said connecting part.

* * * * *